July 7, 1959
C. D. REECE ET AL
2,893,149
ARTIFICIAL TREE
Filed Sept. 29, 1958
4 Sheets-Sheet 1
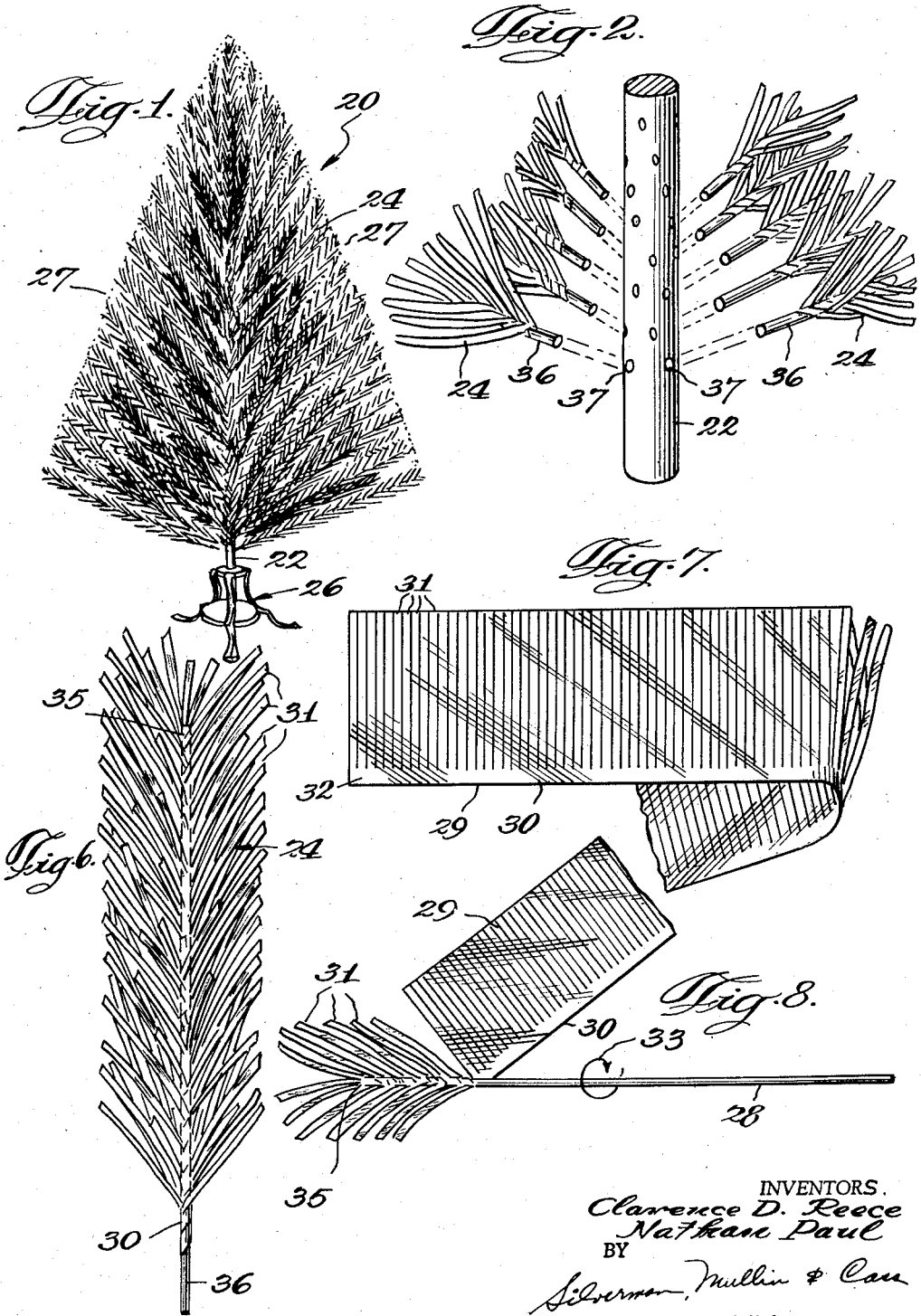

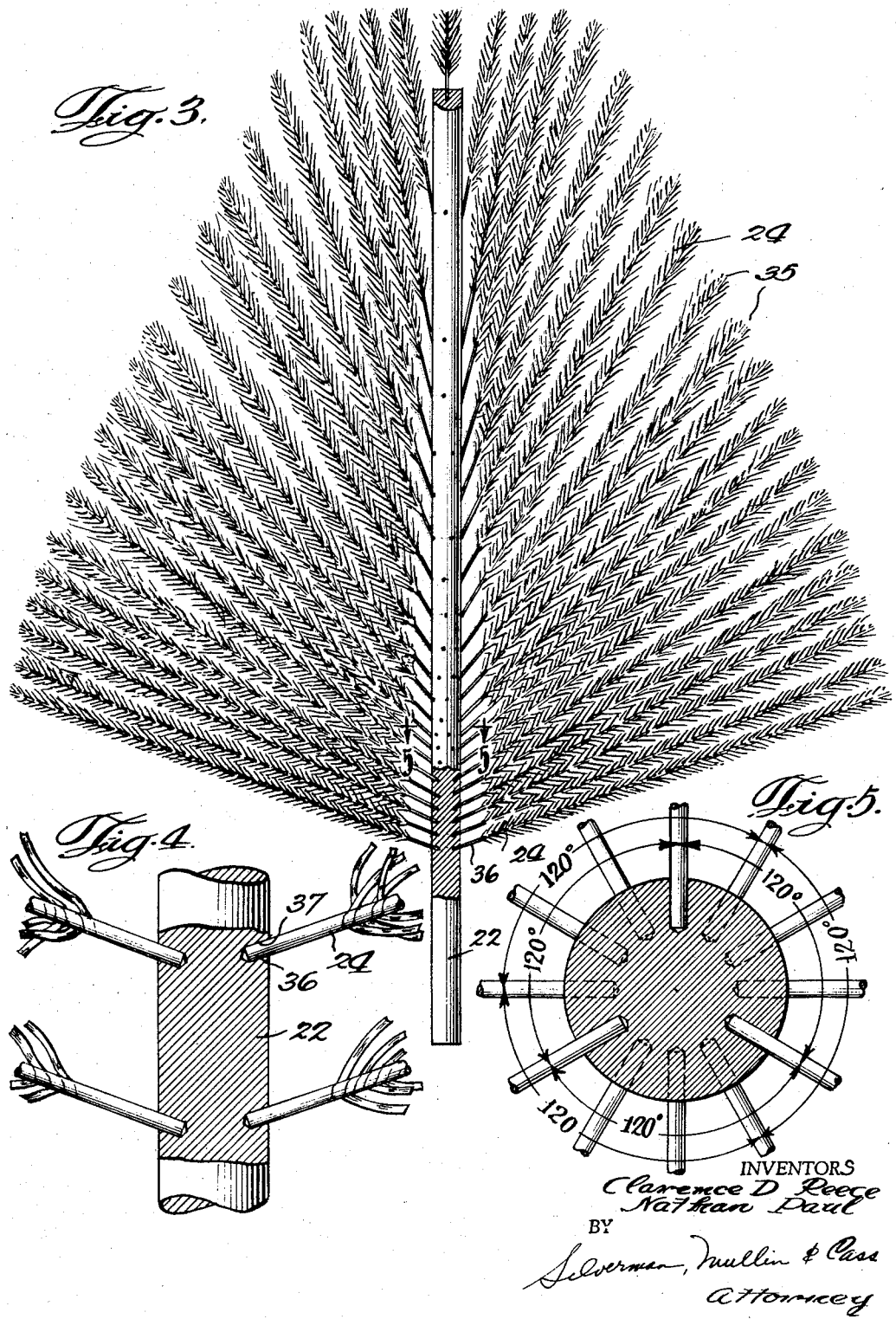

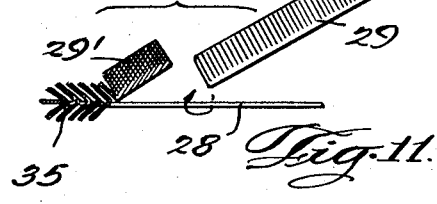
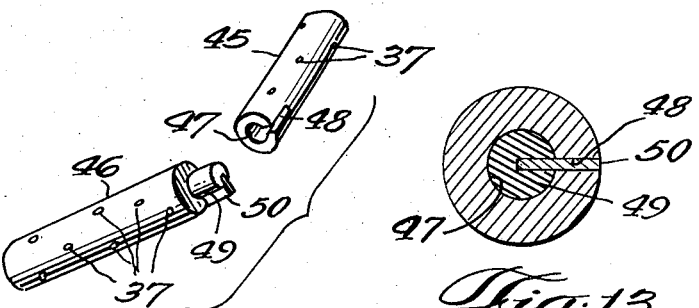
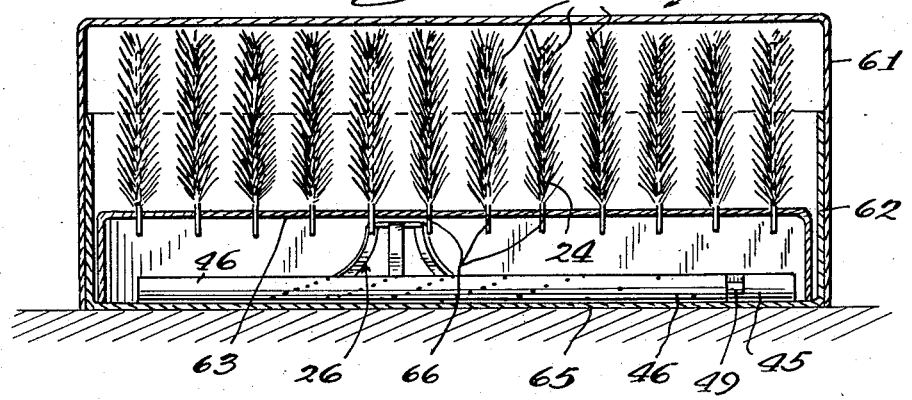

July 7, 1959
C. D. REECE ET AL
2,893,149
ARTIFICIAL TREE
Filed Sept. 29, 1958
4 Sheets-Sheet 4
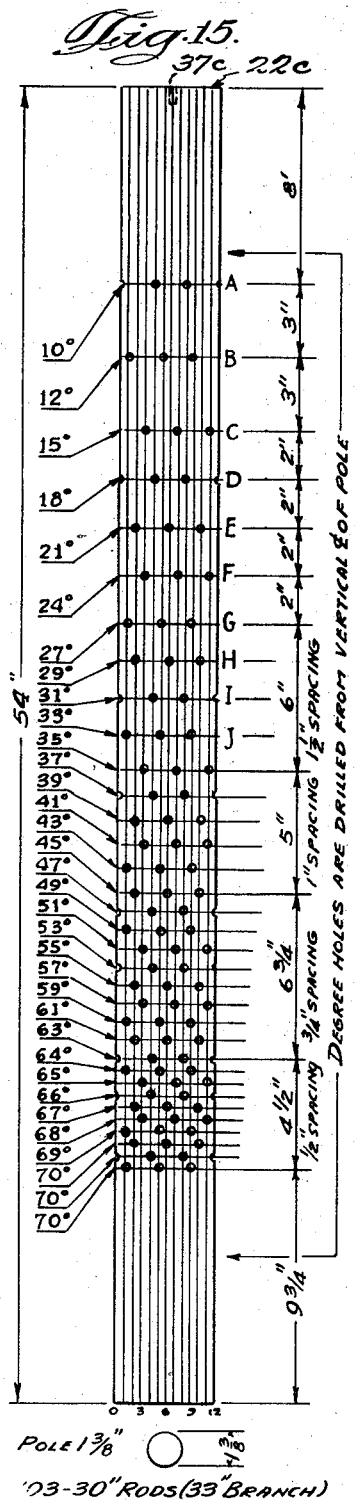
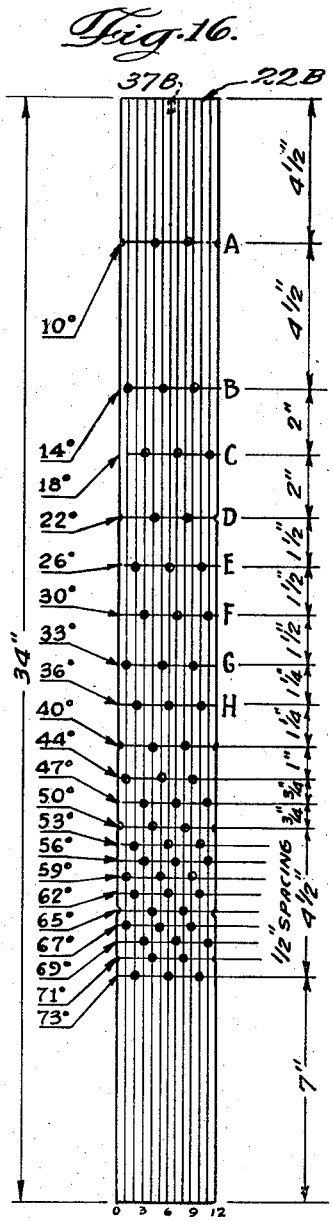
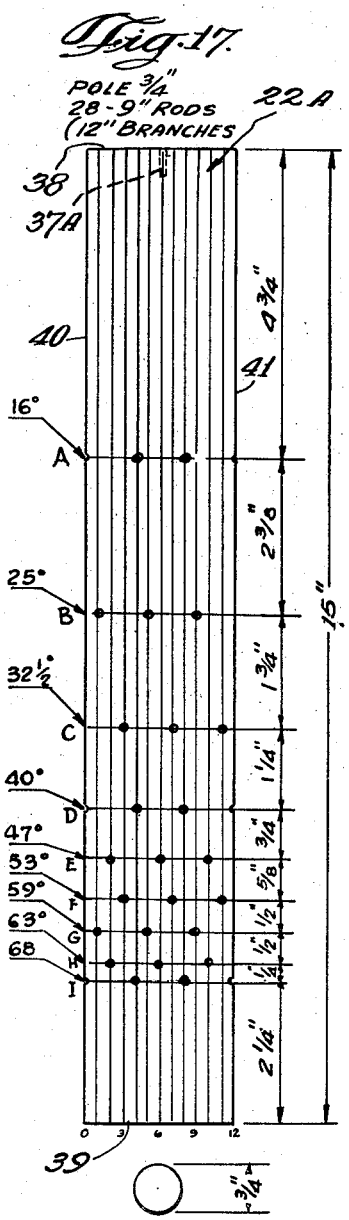
INVENTORS.
Clarence D. Reece
Nathan Paul
BY
Silverman, Mullin & Cass
Attorneys

United States Patent Office 2,893,149
Patented July 7, 1959

2,893,149

ARTIFICIAL TREE

Clarence D. Reece and Nathan Paul, Chicago, Ill., assignors, by mesne assignments, to Modern Coatings, Inc., Chicago, Ill., a corporation of Illinois Application September 29, 1958, Serial No. 763,886

10 Claims. (Cl. 41—15)

This invention relates generally to artificial trees and more particularly, relates to an artificial tree having an exceptionally full and uniform conical appearance achieved by assembled parts capable of being mass produced by relatively high speed and low cost techniques. The invention is further characterized by the form, size and arrangement of the parts thereof which enables the artificial tree to be readily and easily assembled and collapsed by anyone, including young children.

Heretofore, artificial trees of the general character herein concerned have been widely used for decorative and display purposes both in the home and in the merchandising fields, but without complete satisfaction. Many of such artificial trees were made of highly combustible materials which made their use a matter of substantial risk and requiring substantial caution and attendance. Other of such prior art structures were formed of components which required considerable care and skill to fabricate and assemble. Also, such trees were so constructed as to be incapable of re-use either because they could not be collapsed and stored conveniently or the components thereof were not sufficiently durable. In addition, such prior trees have been relatively expensive because of the high cost of manufacture and assembly thereof by reason of the more complicated structure of the trunk and branch components thereof and the means employed for retaining said components in assembly.

Although not specifically limited thereto, the invention herein is specially useful in the fabrication of an artificial tree simulating the configuration of the familiar evergreen tree or conifer universally used as a Christmas tree. Such trees have a generally conical configuration with the apex at the top. Efforts to faithfully reproduce this configuration in an artificial tree have been less than satisfactory for several reasons. Because of the tapered configuration of such a tree, the branch components heretofore employed have been of unequal length with the shorter branches arranged generally at the top of the structure. This has increased the cost of manufacture by reason of the multiple-length branches required, especially since trees of different heights required proportionally different branch lengths. In order to obtain the desired configuration, the branches had to be assembled to the trunk in proper sequence related to their lengths thereby requiring extensive time and care with attendant increased labor costs. Such trees however have been lacking in desirable fullness and density of foliage and the uniform conical configuration associated with the more perfectly formed natural evergreen or conifer.

In recent years, colored Christmas trees, such as flocked trees, have been very popular because of the startling and beautiful effects which can be achieved therewith. Such flocked trees are not safe because of their inflammable nature and are considerably inconvenient because the flocking drops off readily and thereafter is tracked over the surrounding areas and carpeting. These trees are very expensive and usually not re-usable. It is therefore a primary object of this invention to provide an artificial tree of the character described which by reason of its advantageous construction substantially eliminates the disadvantages hereinabove enumerated.

Another important object of the invention is to provide an artificial tree of the character described which is comprised of a trunk component and branch components of substantially equal length, said trunk component having a predetermined arrangement of sockets along the length thereof for receiving the branch components therein, the assembled tree being characterized by a degree of uniformity of conical configuration and fullness and density of foliage heretofore incapable of being achieved by employing prior art principles and techniques.

Another object of the invention is to provide an artificial tree of the character described in which said trunk has the sockets therein arranged in a predetermined group sequence from one end to the other thereof, each group having the sockets thereof arranged with their longitudinal axes equi-angular relative to the longitudinal axis of the trunk, said groups extending along the length of the trunk in a predetermined spaced arrangement in which the distance between adjacent groups along the axis of the trunk and the angle of inclination of the sockets of adjacent groups relative the axis of the trunk vary in accordance with said arrangement.

A further important object of the invention is to provide an artificial tree of the character described which is capable of being readily shipped in collapsed condition and rapidly and easily assembled at the site of use.

Another object of the invention is to provide an artificial tree of the character described in which the branch component is comprised of a rigid rod and a foliage component wrapped from end to end of said rod, said foliage component comprising a strip of extremely flexible thin metallic foil having a continuous, narrow imperforate segment contiguous one edge of the strip and a plurality of sliver-like segments or fillets of equal width integral with said imperforate segment and protruding angularly outwardly of the rod in the completed condition of the branch.

Another object of the invention is to provide a modified form of branch component for the tree embodying the invention in which one end of the rod has a metallic foil wrapping contrasting in color with the wrapping on the remainder of the rod, said contrasting color wrapping being associated with the outer or free end of the branch in the completed tree assembly.

Anothehr important object of the invention is to provide an artificial tree as described which can be formed in different heights with equal facility and advantage thereby providing a range of different stands of trees capable of satisfying general public demands and requirements.

Other objects of the invention will become apparent as the desription thereof ensues, such as, the non-flammable character of the artificial tree by reason of the structure of the trunk and branch components thereof; that said artificial tree is readily capable of re-use; that said artificial tree can be conveniently stored and packaged for shipment in collapsed condition; that same is highly economical and can be mass-produced by high speed, low cost techniques; that same is capable of being varied in structural details thereof, such as forming the trunk of multiple parts having guide means for connecting same to form the trunk with the desired predetermined arrangement of sockets for the branches; as well as other advantages resulting from the novel and advantageous structure of our artificial tree. It is contemplated that minor variations in the arrangement, size, construction and proportion of the several parts may occur to the skilled artisan without departing from the scope or sacrificing any of the advantages of the invention.

A preferred embodiment of the invention will be described in detail conforming with the reference characters assigned to identify components thereof in the accompanying drawings so that the skilled artisan may understand and practice the invention as required by patent statute. In the drawings, wherein the same reference characters are employed to designate the same or equivalent parts throughout the several figures thereof:

Fig. 1 is a perspective view of an artificial tree embodying the invention.

Fig. 2 is a fragmentary diagrammatical exploded view of the trunk and a plurality of branch components of the said tree.

Fig. 3 is a fragmentary elevational view of the tree with branches removed and portions thereof in section to show details of construction thereof.

Fig. 4 is a fragmentary elevational view of the trunk on an enlarged scale to show the manner in which the branches are engaged in the sockets provided therein.

Fig. 5 is a transverse sectional view taken through the trunk component along the line 5—5 of Fig. 3 and in the direction indicated.

Fig. 6 is a plan view of a branch component.

Fig. 7 is a view of the metallic foil strip of the branch of Fig. 6 prior to wrapping thereof and Fig. 8 is a diagrammatical view showing the strip of Fig. 7 partially wrapped on the support rod of the branch.

Fig. 9 is a diagrammatical view of a modified form of the artificial tree in which a plurality of branches thereof have tips thereof of a contrasting color.

Fig. 10 is a plan view of a modified form of the branch component provided with a tip of a contrasting color.

Fig. 11 is a diagrammatical view illustrating the manner in which the branch of Fig. 10 is formed by using metallic foil strips of contrasting colors.

Fig. 12 is a fragmentary perspective view of a trunk formed on a pair of assembled parts.

Fig. 13 is a transverse sectional view taken through the trunk formed by the assembled parts of Fig. 12 along their juncture.

Fig. 14 is a diagrammatical sectional view taken through an artificial tree collapsed and packaged for shipment or storage.

Figs. 15, 16, and 17 are developed views of tree trunk components of different lengths and showing the several predetermined socket arrangements for the branch components employed respectively for tree trunks of 54 inches, 34 inches and 15 inches in length.

Referring now to the drawings, the artificial tree embodying the invention is designated generally by the reference character 20 in Fig. 1. Same is comprised of a trunk component 22 on which is supported a plurality of branch components 24 of substantially identical size and construction. The tree 20 is conical in configuration with the apex thereof at the top. The bottom end of the trunk is received in a conventional pedestal 26, the construction of which may vary in considerable detail, said pedestal merely required to have a socket for removably seating the trunk end therein.

Prior to proceeding with full details of the invention, attention is invited to the external appearance of artificial tree 20 in Fig. 1. The conical surfaces of the body of the tree as developed by the branches 24 are very regular and uniform as can be appreciated from the relatively straight upwardly convergent lateral edges 27 seen in the figure. The branches are angularly disposed upwardly relative the trunk 22 at progressively greater acute angles commencing from the top end. At the bottom of the tree, the branches may be approximately at right angles to the trunk. The foliage of the tree as contributed by branches 24 is uniformly full and dense along the length of the trunk whereby the tree 20 has a luxuriant, decorative and distinctive appearance. Because of the symmetrical configuration of the tree 20, it appears upon superficial examination that the branches 24 are unequal in length, with the shorter branches at the upper end of the tree. This is not the case since all of the branches 24 are substantially equal in length.

Referring to Figs. 6, 7 and 8, each branch 24 is comprised of a metal rod 28 upon which has been wrapped a strip 29 of metallic foil, such as aluminum, seen in Fig. 7. Strip 29 has a continuous, narrow imperforate band 30 contiguous one longitudinal edge thereof, the remaining body of the strip being feathered to produce fillets 31 integral with said segment 30 and perpendicular thereto along the length of the strip, said fillets preferably being of substantially identical width. In forming the branch 24, the rod 28 may be held at one end thereof in a rotatable chuck driven from a suitable motor (not shown), for instance, and strip 29 may be fed as a continuous strip from a reel supported adjacent the motor. The strip is arranged at an angle relative the length of the rod and the free end 32 of segment 30 is crimped or wrapped around the rod adjacent either the free end or secured end thereof. Upon rotation of the rod in direction of arrow 33, the strip segment 30 is helically wrapped around the rod with adjacent turns overlapped. The wrapping procedure causes the fillets 31 to feather out radially of the rod in all directions giving rise to a generally cylindrical formation with the rod 28 at the center. Since the branch is formed of metallic materials, it is non-combustible, although other rigid materials, such as synthetic resins or suitably impregnated or coated wood may be used for the rod 28. It is to be noted from Fig. 6 that there are fillets 31 which extend outwardly beyond the outer end 35 of the rod, the opposite end 36 being exposed or not covered by strip 29. This end 36 is engaged in a suitable socket in trunk 22 in assembly of the tree. It will be appreciated that wrapping of strip 29 on rod 28 may be done manually or mechanically, the technique herein described and illustrated being exemplary only to show how the invention enables high speed, mass-production techniques to be employed. The rods 28 are all equal in length so that no sorting or counting thereof is required.

Digressing to Figs. 9 through 11, there is shown a tree 20' which is constructed in the identical manner of tree 20 of Fig. 1. The majority of the branches of tree 20' are comprised of branches 24 such as described in connection with tree 20. However, there are also a plurality of branches 24' which are characterized by having outer extremities contrasting in color with that of the remainder of the branches 24 and 24'. The branch 24' is seen in Fig. 10, the outer end 24'' thereof being illustrated as darker in apparance than the remaining length of the branch. Referring to Fig. 11, the manner of forming tipped branch 24' is illustrated, rod 29 having the outer extremity 35 wrapped with a metallic foil strip 29' of such contrasting color and a metallic foil strip 29 such as used for branch 24, in the same manner as described in connection with branch 24. It is desired to point out that trees 20 and 20' have the identical number of branch components therein, notwithstanding that a number of the branches of tree 20' are of the tipped variety. The number of tipped branches 24' employed may vary within a wide range, and in fact, the entire tree may be formed of tipped branches 24', if desired. Also, the color of the tipped extremities may vary between branches, or the contrasting strip 29' may be wrapped on another portion of the rod 28. It is believed the skilled artisan will understand this structure without further illustrations being required.

The trunk 22 may be formed of metal as a solid or hollow cylindrical pole or may be formed of other material such as wood whose circumference has been metallized or otherwise treated to render same substantially non-combustible or may be formed of a suitable synthetic plastic material. As seen in Figs. 3 and 4, the branches each have the exposed end 36 thereof engaged in a suitable socket 37 opening to the circumferential surface of the trunk member 22. The depth of each socket 37 is substantially identical so that the branches are each engaged in a socket to the same extent, this being important since all branches of a tree are of equal length. The sockets 37 are arranged along the length of tree 20 in a predetermined spaced sequence as hereinafter described, each socket having its axis angularly disposed relative the longitudinal axis of trunk 22 also in a predetermined relationship.

Referring to Fig. 17, there is shown a developed plan view 22A of a trunk 22 employed for assembly of a tree 20 which is approximately two feet in height from the bottom end 22 of the trunk to the apex of the tree and showing the predetermined arrangement of the sockets. The view represents said trunk 22 as through opened along the length thereof and flattened out. The length of the trunk is fifteen inches and the outside diameter thereof is ¾ inch. Reference characters 38 and 39 represent respectively the top and bottom end faces of the trunk 22. There is a socket 37A opening to end face 38, the axis of which is coincident with the longitudinal axis of the trunk. The other sockets are illustrated in the form of circles intended to denote the openings thereof. The individual groups of sockets are designated respectively A through I commencing from top end 38. It will be noted there are three sockets in each group and each have the centers of their openings aligned along a transverse line perpendicular to the length of the trunk, as indicated. All of the sockets of group A have their openings spaced from the end 38 a distance of 4¾ inches. The sockets of group B have their openings spaced from end 38 a distance of 7⅛ inches. The sockets of group C have their openings spaced from end 38 a distance of 8⅞ inches. The distances of spacing of the several other groups of socket openings are delineated in Fig. 17, the sockets of group I having their openings spaced from bottom end 39 of the trunk a distance of 2¼ inches so as to provide a bare trunk portion to be engaged in the pedestal 26 and space the simulated foliage above the pedestal a short distance.

The various groups of sockets are inclined relative to the longitudinal axis of the trunk in a predetermined arrangement. All of the sockets of group A are inclined upwardly relative the longitudinal axis of trunk 22 sixteen degrees (16°). All of the sockets of group B are inclined upwardly relative the axis of said trunk 25 degrees (25°) and so forth along the length of the trunk 22 as delineated in the figure. To locate the sockets of each group, the plane represented by 22A is divided into twelve equal longitudinal segments indicated by the segment lines 0 to 12 respectively. Commencing at the left hand lateral edge 40, the center of the first socket of group A is located on the fourth segment line or one-third of the distance between lateral edge 40 and opposite edge 41. The second socket of group A is laterally spaced to the right of the first socket four segments or two-thirds of the distance from edge 40 to edge 41. The third socket of group A is laterally spaced from second socket likewise a third of the distance between edges 40 and 41 and located on segment line 12 or 0, since these are coincident in the cylindrical form of the trunk. It will thus be seen that the sockets of group A are laterally spaced apart one-thrid of the distance between edges 40 and 41 in Fig. 17. In the cylindrical form of the trunk, the openings of the sockets of group A will be circumferentially spaced 120 degrees. This same lateral spacing between adjacent sockets of each group is maintained, for instance, adjacent sockets of group B or group E or any of the other groups are circumferentially spaced apart 120 degress or one-third of a circle.

Considering now the individual sockets of groups A and B. Commencing from the left edge 40, the second socket of group B is spaced to the right of the first socket of group A a distance of one segment or one-twelfth of the distance between edges 40 and 41. The third socket of group B is laterally spaced from the second socket of group A a distance of one segment and the first socket of group B is laterally spaced from the third socket of group A a distance of one segment. Considering now groups B and C, commencing from edge 40, the first socket of group C is laterally spaced from the first socket of group B a distance of two segments, the second socket of group C is spaced two segments from the second socket of group B and third socket of group C is spaced two segments from the third socket of group B. Following this plan, it will be seen that the sockets of the several groups are arranged along three helices of non-uniform pitch between lines A and I of the figure. The individual helices, however, are substantially identical in pitch with respect to one another and each group has a socket aligned with its center on a common helix.

Certain generalities are apparent from Fig. 17. The groups I and H are longitudinally spaced along the trunk a distance less than that between group H and G and groups G and H and longitudinally spaced a distance equal to that between groups F and G and so forth along the length of the trunk as delineated in the figure.

The same plan of layout for the sockets is followed in connection with the trunk shown in developed view 22B of Fig. 16 and the trunk shown in developed view 22C of Fig. 15, which are for respectively larger trees, as indicated by the greater lengths of the trunks used. The differences in longitudinal spacing between adjacent groups of three sockets varies in the respective illustrations because of the different length of the trunk employed. Likewise, the angle of inclination of the sockets of each group varies as delineated for the same reason. However, the trunk of view 22B has groups of sockets each containing three sockets and each socket of the group is inclined relative the axis of the trunk in the same amount. Likewise, adjacent sockets of each group are circumferentially spaced apart 120 degrees with the greater angle of inclination at the lower portion of the trunk. The respective lengths of the trunk are indicated as well as the spacing longitudinally between adjacent groups of sockets. The sockets of each of the trunks of Figs. 16 and 15 likewise are arranged along three helices developed on the cylindrical surface of the trunk member, said helices being of non-uniform pitch along the length of the trunk but of uniform relationship one relative the other for each trunk. Each of the groups has a socket aligned on a common helix developed by the socket arrangement pursued. It is believed that a specific enumeration of the various inter-relationships of the trunks of Figs. 15 and 16 as undertaken in the case of Fig. 17 would contribute to an unduly prolific specification and that the skilled artisan can understand and practice the invention from an analysis of the Figs. 15, 16, and 17 which delineate the several relationships required. The number of branches and the length of the rods used for each case is set forth in the figures. It will be noted that for each tree, a particular number of branches is employed. This number, when set into the sockets provided on the trunk, produces the tree 20.

Referring to Figs. 12 and 13, there is illustrated a construction enabling the trunk 22 of a tree to be formed of a plurality of parts capable of being conjoined for erection of the tree. Two trunk parts are indicated at 45 and 46 in Fig. 12. Trunk part 45 has a longitudinal socket or passageway 47 opening to an end face thereof and a key-way 48. The part 46 has a reduced dimension throat or end portion 49 of complementary configuration adapted to be telescoped into socket 47 and a key 50 for engagement in key-way 48. The parts 45 and 46 may be telescopically engaged only with the key 50 received in key-way 48 thereby assuring proper alignment of the sockets 37. Other ways of providing a collapsible trunk component 22 may occur to the skilled artisan as well as other means substituted for the guide means provided by key 50 and key-way 48 to assure proper disposition of the sockets for the branches. Of course, the trunk may be formed as a unitary member of a single length of material.

Referring to Fig. 14, there is illustrated a manner of packaging the tree 20 for shipment or storage to show the ready and convenient collapsibility of the structure. Reference character 60 represents the packaged tree, same being carried in a suitable container such as illustrated formed of a pair of telescopically joined half sections 61 and 62. Said container may be formed of corrugated paperboard, cardboard or wood or other convenient and available material for a relatively inexpensive package. The inner or bottom part 62 of the container has a platform 63 supported on and spaced above the bottom wall 65 thereof, said platform having a plurality of holes 66 therethrough in each of which a branch 24 may be vertically supported, as illustrated. In the space between platform 63 and the bottom wall 65 may be accommodated the pedestal 26 and the trunk which has been illustrated as comprised of the parts 45 and 46, although as explained, said trunk may comprise a single member and the container suitably dimensioned to accommodate such a trunk. Other forms of containers are contemplated as being feasible, the illustration of Fig. 14 illustrating the ease and simplicity with which the tree 20 can be shipped and stored in knock-down condition.

It will be appreciated that the tree 20 may be made in other sizes, as well, following the general principles for arranging the sockets for mounting the branches. Slight variation in the arrangement is possible without undue distortion in the tree's appearance and configuration. The manner of forming said sockets can vary, considerable success having been achieved with a hollow jig in which the pole is inserted, the annular walls of the jig having pre-arranged openings through which a drill can be inserted to form the sockets. The depth of each socket is controllable by such a jig.

It is believed the invention has been described in sufficient detail to enable the skilled artisan to practice the same. The invention has been pointed out in the appended claims as required by the patent statutes, it being intended that the language thereof be construed broadly commensurate with the progress in the arts and sciences contributed by said invention.

What it is desired to secure by Letters Patent of the United States is:

1. An artificial tree comprising, an elongate, substantially cylindrical trunk member having a plurality of branch members of substantially equal length removably secured thereto at varying angles of inclination with respect to the longitudinal axis of the trunk member, the angles of inclination of the stems of said branches relative to said axis of the trunk decreasing in a direction approaching the apex of the tree, the outer extremities of the branch members cooperating to define a substantially uniform conical configuration simulating the configuration of a natural tree.

2. A tree as described in claim 1 wherein the trunk member is formed with branch-receiving openings arranged along the major portion of the length of the trunk member.

3. A tree as described in claim 1 wherein the trunk member has a branch-receiving opening for each branch member and said openings are arranged in spaced apart groups along the length of the trunk, adjacent openings of each group being substantially equally spaced apart in a lateral direction relative the axis of the trunk.

4. An artificial tree as described in claim 1 in which there is a socket in the upper end of the trunk coincident with the longitudinal axis of the trunk and a branch engaged in said socket.

5. A tree as described in claim 1 wherein the trunk member has a plurality of branch-receiving openings each having a branch member telescoped therein, said openings being arranged along a plurality of helical lines developed on the circumference of the tree trunk each of non-uniform pitch along the length of the trunk.

6. A tree as described in claim 3 wherein each group of openings is aligned along a plane perpendicular to said axis.

7. A tree as described in claim 6 wherein each group has the same number of openings and adjacent groups along the trunk have their openings laterally offset one relative the other.

8. A tree as described in claim 1 in which the trunk member has branch-receiving sockets arranged in spaced apart groups along a major portion of the length of the trunk member, said sockets having their axes inclined relative to the axis of the trunk, the angles of inclination of the sockets of each group being substantially identical.

9. A tree as described in claim 1 in which the trunk member is formed with branch-receiving sockets arranged in spaced apart groups along the length of the trunk member, said sockets having their axes angularly inclined relative the axis of the trunk, the angles of inclination of the individual sockets of each group being substantially equal, the differential in angular inclination between adjacent groups of sockets being greater approaching the upper end of the tree.

10. A tree as described in claim 3 in which the differential in angular inclination between adjacent groups of openings in the lower half of the trunk member is less than that between adjacent groups of openings in the upper half.

References Cited in the file of this patent

UNITED STATES PATENTS

| | | |
|---|---|---|
| 255,902 | Wegenroth | Apr. 4, 1882 |
| 1,266,749 | Abbott | May 21, 1918 |
| 2,639,532 | Seewald | May 26, 1953 |
| 2,814,897 | Helbrich | Dec. 3, 1957 |